United States Patent
Antony et al.

(10) Patent No.: US 7,246,354 B1
(45) Date of Patent: Jul. 17, 2007

(54) NMS CORBA LISTENER FOR EMS SIGNALS

(75) Inventors: Sony Antony, Atlanta, GA (US); Harry Tang, Atlanta, GA (US); Vikas Varma, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 765 days.

(21) Appl. No.: 10/259,732

(22) Filed: Sep. 30, 2002

(51) Int. Cl.
*G05F 9/46* (2006.01)
*G05F 9/44* (2006.01)
*G05F 15/173* (2006.01)

(52) U.S. Cl. .................... 718/101; 719/318; 709/223

(58) Field of Classification Search ............ 709/310, 709/223–224; 719/318; 718/101
See application file for complete search history.

(56) References Cited

U.S. PATENT DOCUMENTS

| | | | |
|---|---|---|---|
| 5,768,119 A | 6/1998 | Havekost et al. | |
| 5,796,393 A * | 8/1998 | MacNaughton et al. | 715/733 |
| 5,958,010 A | 9/1999 | Agarwal et al. | |
| 6,260,062 B1 * | 7/2001 | Davis et al. | 709/223 |
| 6,324,587 B1 * | 11/2001 | Trenbeath et al. | 719/310 |
| 6,349,335 B1 | 2/2002 | Jenney | |
| 6,424,872 B1 | 7/2002 | Glanzer et al. | |
| 6,505,244 B1 * | 1/2003 | Natarajan et al. | 709/223 |
| 6,564,341 B1 | 5/2003 | Sundaram et al. | |
| 6,714,976 B1 | 3/2004 | Wilson et al. | |
| 6,901,440 B1 | 5/2005 | Bimm et al. | |
| 6,950,935 B1 | 9/2005 | Allavarpu et al. | |
| 6,970,919 B1 | 11/2005 | Doi et al. | |
| 7,010,586 B1 * | 3/2006 | Allavarpu et al. | 709/223 |
| 7,020,707 B2 | 3/2006 | Sternagle | |
| 7,062,549 B1 | 6/2006 | Miller et al. | |
| 2002/0156930 A1 * | 10/2002 | Velasquez | 709/310 |
| 2003/0055946 A1 | 3/2003 | Amemiya | |

OTHER PUBLICATIONS

Technical Report, Protocol Independent Object Model for ADSL EMS-NMS Interface, Mar. 2000.

\* cited by examiner

*Primary Examiner*—Meng-Al T. An
*Assistant Examiner*—Camquy Truong
(74) *Attorney, Agent, or Firm*—Withers & Key, LLC

(57) ABSTRACT

A system and method is described for informing an upstream NMS when any changes have occurred in an electronic system architecture through a notification listener. The listener receives signals from EMS and translates them into a readily relayable format and forwards the signals to the NMS.

16 Claims, 4 Drawing Sheets

NMS CORBA LISTENER FOR EMS SIGNALS

BACKGROUND

1. Field of the Invention

The present invention relates to systems and methods for communicating between machines using a universal interface. More particularly, the present invention relates to systems and methods for receiving information regarding changes in downstream architecture and repackaging and relaying such information upstream using a CORBA interface.

2. Background of the Invention

In the increasingly sophisticated field of electronic communication, particularly between electronic systems or machines, the TL-1 line protocol has remained a common industry standard. TL-1 lines are used as a communication medium between different electronic systems or machines, particularly in Internet-related and telecommunications-related systems. However, TL-1 commands are typically very specific and limited to the type of systems or machines that utilize such communication lines. For example, each distinct system component may require its own unique TL-1 commands or inputs that take into account the specifics of the particular component.

Such a need for detailed characteristics generally makes use of TL-1 commands complicated and time-consuming. Further, using TL-1 commands from different system components make it difficult for the components to communicate with one another, even though all use a general TL-1 command protocol. Finally, much detail is required to determine the specific programming characteristics of each hardware component that is being connected with a given TL-1 line. Thus, although ubiquitously used, TL-1 lines have a number of limiting characteristics.

One of the most limiting characteristics of a TL-1 line is that it does not allow for efficient communication between interconnected hardware. For example, if a change is made in a downstream component of an electronic system, it would be very difficult for an upstream component to receive "real-time" information about that specific downstream change. Typically, when a downstream change is currently made to, for example, a component of a system, such change is communicated to an upstream programmer by the person who has made such a change in the downstream component. Such a requirement for the person who creates changes to communicate them "manually" to upstream programmers is inefficient and prone to errors, such as when the person forgets to relay such information to upstream programmers.

As a further non-limiting example, if an electronic switch or card is changed in a downstream component of an electronic network, TL-1 lines connecting the series of network components to an upstream programmer would not efficiently allow the programmer to be cognizant of the change. Such a programmer may receive some indication that a change was made in that specific downstream component if the programmer sends a specific command related to that changed component and the component responds, because of the change, in a way that the programmer was not expecting. This conventional "reactive" method of determining changes downstream is inefficient and prone to errors, particularly when the upstream programmer is not aware of the downstream changes.

SUMMARY OF THE INVENTION

In exemplary embodiments of the present invention, systems and methods are presented that enable an upstream component of a network system to become aware of downstream changes in network architecture. As a non-limiting example, an upstream network management system is informed of downstream changes in machinery or system configurations when such changes occur, as close to "real time" as possible, and thus enabling the upstream network management system to re-configure the network architecture in its memory quickly and accurately so as to keep updated of the true network architecture. Further, such downstream changes are efficiently transmitted upstream using inter-machine language protocols that are readily understandable by a variety of types of machines, thereby making the transmission of such information more rapid and efficient, without the need for re-configuring the transmitting language line to take into account the specifics of every machine that the lines are connected to.

In one exemplary embodiment of the present invention, a system is disclosed for relaying information relating to changes in electronic architecture configurations. The system includes an electronic component, an EMS in communication with the electronic component, wherein the EMS receives a notification signal transmitted by the electronic component to the EMS when a change has been made in the electronic component, a notification listener in communication with the EMS, wherein the notification listener receives the notification signal from the EMS and translates it into a universally understandable format, and an NMS in communication with the notification listener, wherein the NMS receives the translated signal that indicates information about the change in the electronic component.

In another exemplary embodiment of the present invention, a system is disclosed for transmitting real time information upstream in an electronic architecture. The system includes an electronic architecture, an EMS located upstream from and in communication with the electronic architecture, wherein the EMS receives a notification signal transmitted by the electronic architecture to the EMS when a change has been made in the electronic architecture, a signal translating device in communication with the EMS, wherein the signal translating device receives the notification signal from the EMS and translates it into a universally understandable format, and an NMS in communication with the notification listener, wherein the NMS receives the translated signal that indicates information about the change in the electronic architecture.

In yet another exemplary embodiment of the present invention, a system is disclosed for relaying information relating to changes in electronic architecture configurations. The system includes an electronic component, an EMS in communication with the electronic component, wherein the EMS receives a notification signal transmitted by the electronic component to the EMS when a change has been made in the electronic component, means for receiving the notification signal from the EMS and translating it into a universally understandable format, and an NMS in communication with the means for receiving, the NMS receiving the translated signal that indicates information about the change in the electronic component.

In an exemplary embodiment of the present invention, a device is disclosed for receiving information relating to changes in downstream electronic architecture. The device includes means for receiving information from EMS relating to changes in downstream electronic architecture, means for recognizing the information in its specific format, means for translating the information into a universally understandable format, and means for transmitting the translated information to an upstream NMS.

In another exemplary embodiment of the present invention, an asynchronous method is disclosed for receiving information from an EMS relating to changes in a system architecture connected to the EMS, and forwarding the information to an NMS. The method includes receiving information from EMS relating to changes in the system architecture when there has been a change, translating the information into a universally understandable format, and transmitting the translated information to the NMS.

DETAILED DESCRIPTION OF PREFERRED EMBODIMENTS

The systems and methods according to the present invention utilize a universal interface between machines to allow for better communication in either direction. Such a universal interface may be, for example, CORBA, which will be described in more detail below. However, the present invention is not limited to CORBA and may use any other type of universal interface that facilitates communication between two or more machines in electronic communication. Other interfaces include, for example, Java-based interfaces.

Figure 1:
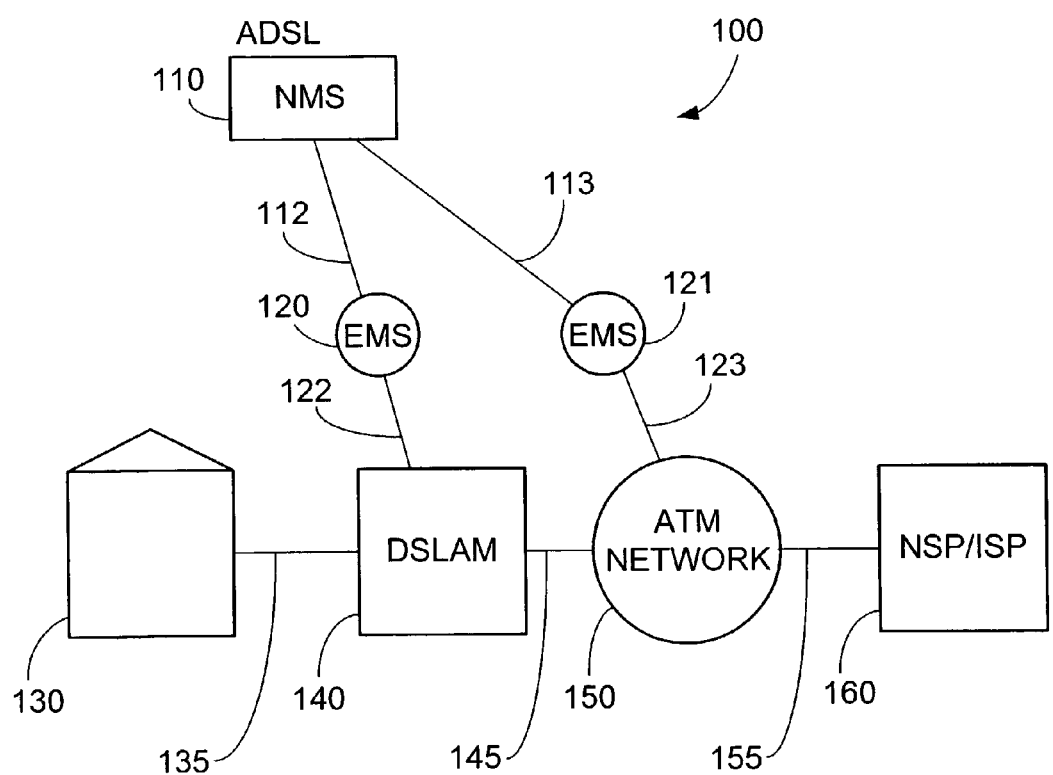
FIG. 1 shows an exemplary embodiment of an ADSL system architecture where an NMS tests or controls various components of the system through one or more EMS.

Showing an exemplary embodiment graphically as system 100 in FIG. 1, a network management system ("NMS") 110 has communication with one or more electronic management systems ("EMS") 120 and 121 through telecommunication pathways 112 and 113, respectively. Telecommunication pathways 112, 113 and others shown here and throughout this disclosure may be any common type of electronic communication medium that connects two electronic machines, unless otherwise indicated.

A given NMS may be, for example, a telecommunication company, and have hundreds of EMS connecting to it. The NMS 110 shown in FIG. 1 may be a part of an asymmetric digital subscriber line ("ADSL") of, for example, a telephone or telecommunication company. Each EMS 120 and 121 has control of one or more systems or machines in communication with it. For example, EMS 120 is in communication and in control of digital subscriber line access multiplexer ("DSLAM") 140. Similarly, EMS 121 is in communication and in control of asynchronous transfer mode network 150 ("ATM NETWORK").

In exemplary system 100 shown in FIG. 1, a given user, such as, for example, a user operating from home 130, is in communication with DSLAM 140 through communication pathway 135. Also, DSLAM 140 is in communication with ATM NETWORK 150 through communication pathway 145. Finally, ATM NETWORK 150 is in communication with a network service provider or Internet service provider 160 ("NSP/ISP") through communication pathway 155.

A programmer using the NMS 110 system may evaluate the conditions of the downstream components DSLAM 140 and ATM NETWORK 150 through use of EMS 120 and 121, respectively. For example, to evaluate the condition of DSLAM 140, a programmer may send a signal through NMS 110 that is transmitted along communication pathway 112 to EMS 120, and along communication pathway 122 to DSLAM 140 to evaluate its condition. If DSLAM 140 is not operating properly, the return signal from DSLAM 140 back to NMS 110 may indicate a malfunction. In a similar fashion, NMS 110 may determine the proper function of ATM NETWORK 150 using EMS 121 through communication pathways 113 and 123.

Furthermore, the proper operation of NSP/ISP 160 may also be evaluated by EMS 120 or 121. Any anomalies in any component of the system 100 then may be determined by NMS 110 and subsequent changes and repairs may be made. Although such a system 100 is typically effective in testing for proper operation of system components, it is "reactive" to changes that have already been made in the system. Further, system 100 does not detect a change when the change occurs but after a test signal is sent out, and is thus not "proactive" in considering such changes as they occur, for example, in "real time".

The exemplary embodiment of a reactive system 100 shown in FIG. 1 is merely one type of many possible types of reactive, synchronous systems. A more generic view of reactive and proactive systems may be beneficial in understanding the differences between such systems.

Figure 2:
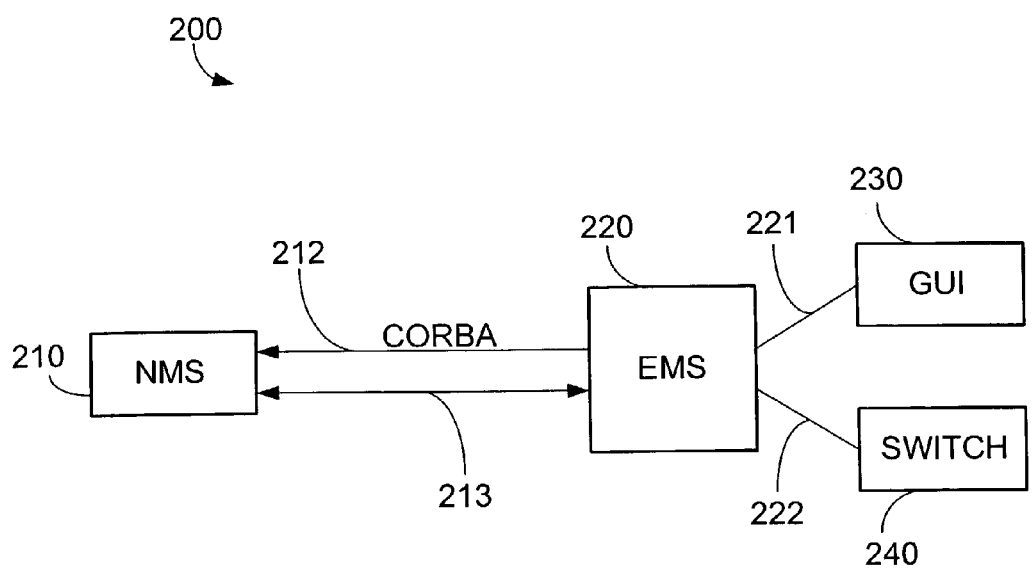
FIG. 2 shows an exemplary embodiment of a system with an NMS in communication with an EMS through several communication pathways that enable information transmission between the EMS and NMS.

A more generic example of a system having both reactive configurations, as is common in conventional systems, and proactive configurations, with exemplary embodiments shown herein, is shown as system 200 in FIG. 2. In this system 200, NMS 210 is in communication with one or more EMS 220 through exemplary communication pathways 212 and 213. EMS 220 is also in communication through exemplary communication pathway 221 with one or more graphic user interfaces 230 ("GUI"), which allow control and testing of EMS 220. Further, one or more switches 240 may also be in communication with EMS 220 through exemplary communication pathway 222.

Communication pathways 212 and 213, although they connect NMS 210 with EMS 220, operate in different ways and therefore have different capabilities. Communication pathway 213 may be based on open system interconnection ("OSI") or CORBA and is conventionally used as a two-way communication path. For example, when a signal is sent by NMS 210 to verify the operation of a downstream switch 240, the signal is transmitted along communication path 213 to EMS 220, along communication path 222, to switch 240. When the status of switch 240 is determined, then a return signal is sent back through communication path 222 to EMS 220, and then along communication path 213, to NMS 210. Thus, communication path 213 may operate in both directions, NMS 210 to EMS 220 and EMS 220 to NMS 210, and is thereby termed "synchronous" to indicate that for a given signal that is projected from NMS 210, a corresponding return signal is returned to NMS 210 that corresponds to, or is "in sync" with, the original NMS 210 signal.

However, some of the limitations of system 200 become evident when a programmer changes a component or operation of system 200 downstream of NMS 210. For example, if a programmer using GUI 230 changes a function or operation of EMS 220, such as, for example, by changing a card stored within EMS 220, such change is not registered into NMS 210 automatically. Usually, the programmer who affected such a change downstream in system 200 contacts an operator of NMS 210 and informs the operator of the change, thereby enabling the operator to make such a change in the configurations of NMS 210 to reflect the downstream change. This requirement of the programmer downstream having to communicate "manually" any changes in the downstream component of system 200 with an operator of NMS 210 to note such changes in NMS 210 configuration upstream is both inefficient and unreliable. If, for example, the programmer fails to make the operator of NMS 210 aware of the changes, then NMS 210 is not changed to reflect the true downstream architecture, and errors could result during operation of NMS 210.

Alternatively, an operator of NMS 210 may be able to detect changes in the system 200 that have occurred downstream of NMS 210 if while a synchronous command operation through communication pathway 213, a return message is received that is unexpected or specifically indicates that a certain operation is not possible because a certain downstream component is not in operation or has been changed. Although such reactive information gathering may sometimes be helpful in understanding what downstream changes have been made, it is inefficient and may result in wasted resources if such downstream changes are difficult to detect immediately. An operator of NMS 210 who notes that certain changes may have been made in the system without notification of NMS 210 may not be able to discern what those changes were, and may have to spend wasted time and resources in determining such changes.

Thus, a need exists to efficiently and effectively communicate any downstream changes in an exemplary system 200 with the upstream NMS 210 to allow NMS memory architecture and design to be updated to reflect the true architecture of the system 200. Communication path 212 may be used for such an "asynchronous" system that communicates upstream any changes that have been made downstream, in near "real time". Such an exemplary asynchronous pathway 212 may be one directional, from downstream to upstream, and is activated upon effecting a change in the system architecture anywhere in system 200 downstream of NMS 210.

Using the same scenario described above with respect to FIG. 2 but with an "asynchronous" reaction system, if the switch 240 is changed downstream in system 200, NMS 210 will be alerted to this change automatically by a notification message that traverses upstream through EMS 220 and through communication pathway 212 into NMS 210. To make such asynchronous messaging strategies effective and efficient, a "CORBA" interface is used in conjunction with communication pathway 212 to enable efficient and rapid inter-machine communication.

This "CORBA" interface is an alternative to the TL-1 protocol and stands for "common object request broker architecture". CORBA is object-oriented, which means that the language or commands are structured in such a manner that many machine interfaces may use it and thereby communicate effectively with each other. Thus, CORBA has the potential to unify the languages used by different electronic systems and machines into a single command language that is understandable by many different systems. A variety of systems, such as, for example, UNIX, SOLARIS, WINDOWS, DOS, and embedded systems, may support CORBA commands. Thus, CORBA may be universally supported by different computer systems that previously were not able to communicate with each other effectively.

Use of a universal command language and interface, such as CORBA, decreases time requirements for personnel, such as, for example, programmers, controllers, engineers, and technicians, who previously had to concern themselves with much detail of each new machine that was to be communicated with each existing system into the specifics of the language required by each machine. For example, when connecting a new machine to an existing system using a conventional communication line, such as for example, a TL-1 or similar line, the specific characteristics of the new machine must be considered in constructing a TL-1 command language that enables the new machine to communicate with the existing system. Such a stringent requirement is not necessary when using CORBA interface such that with CORBA, the machines are, for example, only instructed about what functions they are to perform, rather than having to the consider the specifics of the machine.

Figure 3:
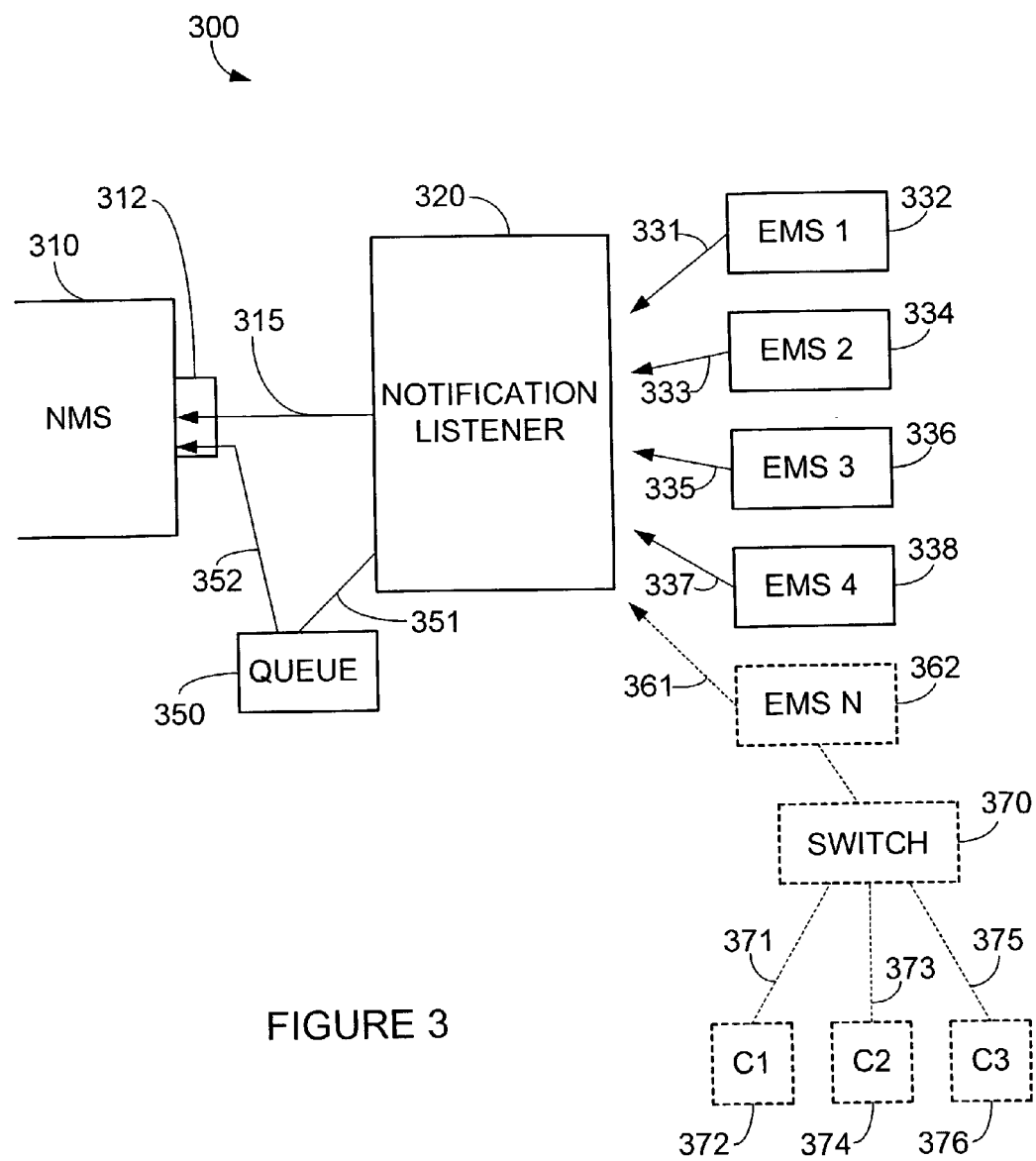
FIG. 3 shows an exemplary embodiment of a system or method according to the present invention that includes a notification listener that receives notification signals from one or more downstream EMS and transmits such signals onto an upstream NMS.

Another exemplary embodiment of such a system 300 utilizing CORBA interface as the operating language of an asynchronous notification system is shown in FIG. 3. In system 300, an NMS 310 is located upstream in system 300 and thereby has control over the operations of the system. One or more EMS 332, 334, 336, 338, and 362 are in communication with NMS 310 through one or more communication paths 331, 333, 335, 337, and 361, respectively.

Each such EMS 332, 334, 336, 338, and 362 may also be in communication and/or in control of one or more switches. A single exemplary switch 370 in communication with EMS 362 is shown as an example. However, each EMS, such as EMS 362, may be in communication with one or more switches or other machines or components (not shown for sake of simplicity) within its control.

Each switch, such as, for example, switch 370, may control a given function for one or more customers 372, 374, and 376 through communication pathways 371, 373, and 375, respectively. Thus, a given NMS 310 may have control over countless components downstream, including, for example, EMS 332, 334, 336, 338, and 362, switch 370, for customers 372, 374, and 376. Each downstream component may communicate in a slightly different manner. What is shown in the exemplary embodiments of the present invention is a universal process for receiving and translating all such information from downstream components and relaying such translated information upstream.

In order to keep track of all such changes to the downstream components of system 300, NMS 310 may use a notification listener 320 that receives all signals of change from downstream components, translates each signal into an understandable universal format through CORBA interface, aggregates all such changes into a common nucleus, and forwards such change notifications in translated form to NMS 310. Notification listener 320 acts as a "central processing station" that receives, translates, aggregates, and filters incoming signals. Further, notification listener 320 is extensible and may expand to accommodate additional numbers of EMS inputs and other components.

Upon processing incoming notification messages from various EMS 332, 334, 336, 338, and 362, notification listener 320 unravels the message, and determines what which component sent the message and what the message is. Then notification listener 320 re-presents the information in a fashion that is more easily understandable by upstream NMS 310 and forwards the processed and translated messages to NMS 310 through communication pathway 315. Optionally, before the forwarded message reaches NMS 310, it first passes through a CORBA access server 312 ("CA Server"), which acts as an entry point to NMS 310 and may control and filter messages that reach NMS 310. Although NMS 310 is shown in the figures herein as a single block or component for sake of simplicity, NMS 310 may comprise two or more software components operating independently and in coordination with each other. Thus, CA Server 312 acts as a gateway to these sets of software components that in conjunction constitute NMS 310.

Any changes in system components of system 300 may be automatically relayed to NMS 310 through notification listener 320 using a common interface language, such as CORBA. A "trigger" enables the system 300 to know that a change has been made within it. This trigger may be made inherent in the hardware. For example, a trigger may be a set of higher level self diagnostic rules defined by a manufacturer. Such a trigger may be initiated by an action such as a technician physically pulling an electronic card, or a controller card trying to communicate to a lesser card but failing to do so. When such a triggerable condition is detected, the hardware may communicate this information to its controlling EMS software system. Other types of triggers, for example, based on software that periodically checks for system components, are possible.

If CA Server 312 or NMS 310 have become non-operational because, for example, either has crashed, then messages from notification listener 320 are unable to reach NMS 310. Hence, such messages may then be re-routed through communication pathway 351 to queue handler 350, which may store the messages and all future messages that are also unable to reach NMS, in the order received. Queued messages in queue handler 350 remain stored in queue until both CA Server 312 and NMS 310 are again operational, and any such messages are then forwarded to NMS 310 through communication pathway 352.

Notification listener 320 may detect that CA Server 312 is non-operational through a number of different ways. For example, if CA Server 312 is non-operational, attempts to communicate with it using CORBA interface will give rise to an alert condition, which may be called an "exception" in technical terms. So while notification listener 320 tries to transmit a notification to CA Server 312, and such an attempt fails and initiates an alert condition, this is an indication that something is wrong with the communication with CA Server 312. At this point, a CORBA-provided checking mechanism may be used to determine whether CA Server 312 exists at all. Such an exemplary procedure may be used by a technician to determine whether CA Server 312 is functional. Other procedures are also possible.

Although use of universal communication interfaces, such as, for example, CORBA, enable multiple systems and machines to communicate with each other effectively, different forms of CORBA interfaces need to be accounted for in an efficient manner. As illustrated in the exemplary embodiment shown in FIG. 4, a system 400 may have components that account for differences in CORBA interfaces. System 400 includes one or more exemplary EMS 430 and 440 that communicate with a notification listener 420 through communication pathways 433 and 443, respectively.

Figure 4:
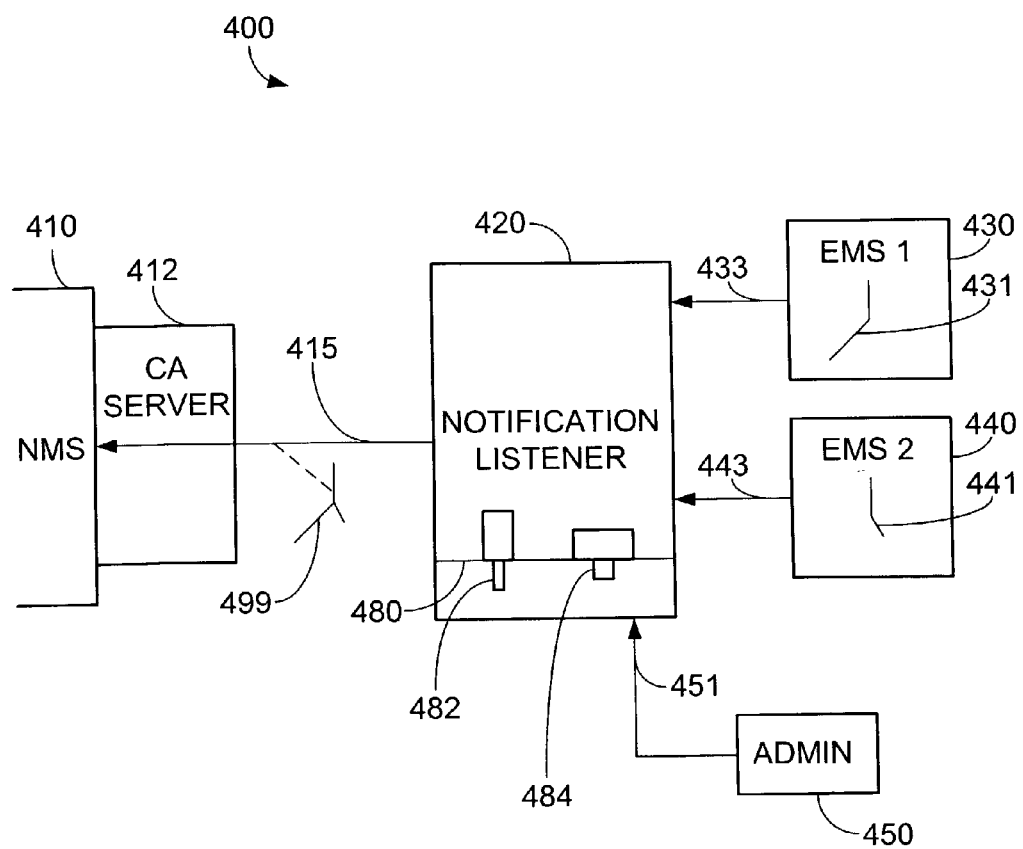
FIG. 4 shows an exemplary embodiment of a system or method according to the present invention that includes various type-specific plugs within a notification listener, each plug assisting in translation of different forms of CORBA language signals that are received from one or more EMS.

Each EMS may utilize a CORBA interface that has slightly different format because each has been developed by, for example, a different vendor. Further, each CORBA vendor develops a type of CORBA interface that has its own distinguishing characteristics. For example, EMS 430 may have a unique CORBA interface 431 that is developed by a first vendor such as, for example, CATENA (Redwood Shores, Calif.). Likewise, EMS 440 may have a unique CORBA interface 441 that is developed by a second vendor such as, for example, MARCONI (Warrendale, Pa.). Two EMS 430 and 440 are shown in FIG. 4 for sake of simplicity, but any number of EMS are possible, each EMS having the same or different characteristics because each EMS was developed by the same or different vendors.

Each unique CORBA notification signal 431 and 441 from EMS 1 and EMS 2, respectively, is transmitted to notification listener 420, where they are translated and aggregated, before being passed on to NMS 410 through CA Server 412. To assist in translating different forms of CORBA notifications, notification listener 420 may have an interface wall 480, which may be a software framework, wherein one or more "plugs" 482 and 484 may be inserted, each plug 482 and 484 being unique to a specific and distinct CORBA interface.

Such an interface wall 480 and corresponding plugs 482 and 484 may be, for example, modules of software. For example, plug 482 may be specific to the CATENA form of CORBA interface, as carried by EMS 1 in its notification signal 431. Thus plug 482 recognizes the unique characteristics of signal 431 and translates the signal 431 taking such unique characteristics into account. Similarly, plug 484 may be specific to the MARCONI form of CORBA interface, as carried by EMS 2 in its notification signal 441. Thus plug 484 recognizes the unique characteristics of signal 441 and translates the signal 441 taking such unique characteristics into account.

Notification listener 420 is not limited to plugs 482 and 484, each carrying information helpful for understanding and translating different forms of CORBA interface. Interface wall 480 may accommodate one or more plugs, each plug used to translate the unique characteristics of a different type of CORBA interface. Two plugs 482 and 484 have been shown in FIG. 4 for sake of simplicity but notification listener 420 is not limited to two plugs. Each plug 482 and 484 may be a unique program code that recognizes and translates the unique program codes that are present in its specific corresponding CORBA interface type upon receiving a notification signal at notification listener 420. Further, as each new type of CORBA interface is accommodated by notification listener 420, a new type of plug, which may be a software program or subroutine, is created and added to the interface wall 480. Such an interface wall 480 having capabilities of accommodating one or more plugs make it possible to establish communication and service with countless new CORBA interfaces, essentially creating an efficient "plug and play" architecture.

In operation, notification listener 420 acts as a CORBA interface server that connects itself to various EMS notification channels and "listens" for downstream information, such as notification signals. If a notification arrives from any of the channels, notification listener 420 will unpack the contained CORBA data and translate it into a universally understandable CORBA format, such as by using open system interconnection ("OSI"). Then notification listener 420 transmits the re-configured notification information upstream to NMS 410.

More specifically, as each unique CORBA notification signal 431 and 441 is translated in notification listener 420, a translated signal 499 having characteristics of each CORBA interface type may be transmitted via communication path 415 through CA server 412 into NMS 410. Signal 499 may be comprised of a single notification signal from a single EMS source or it may be a combination signal from many EMS sources. However, whether derived from a single EMS signal or a combination of EMS signals, signal 499 should be in a translated CORBA protocol that is accepted by CA server 412 and understandable by NMS 410.

Notification listener 420, interface wall 480, and plugs 482 and 484 may be easily adaptable to different conditions by direct access by an administrator 450 through communication pathway 451. Such a direct access route enables facilitated additions, deletions, and changes to notification listener 420 structure without undue waste of resources. For example, if a new form of CORBA interface is developed, a new corresponding plug specific to that new form of CORBA interface may be created and inserted into interface wall 480. Other direct changes are possible.

The exemplary systems and methods described above according to the present invention have many advantages. One such advantage is the automated nature of the system. Whenever a downstream change is made in an electronic architecture under the control of a specific NMS, the system enables that NMS to become aware of the change in the architecture through a notification signal derived from the point of change in the architecture. In other words, the specific area that receives a change in status notifies its controlling NMS upstream that the change has been made and that the NMS should make note of such a change in its cumulative architecture of the entire system. Such "asynchronous" notification signals are constantly being transmitted upstream through durable and efficient CORBA interface connections and a centralized notification listener processing unit to enable fast object-oriented communication between components and machines in the communication lines between the point of change and the desired upstream NMS.

Another unique advantage of the systems and methods according to the present invention is its ability for rapid expansion. New EMS systems may be added to an existing architecture very rapidly without typical concerns associated with TL-1 lines, such as, for example, concerns with the details of the machines and systems being added. Use of CORBA interface in attaching new system components and machines enable rapid expansion because of CORBA's characteristic object-oriented language protocol that does not require component or machine specifics. The centralized notification listener acts as a gateway that receives information in different CORBA interface formats, and re-configures the information into a universally understandable format and transmits the re-configured information upstream to NMS.

Furthermore, the systems and methods of the present invention also enable incorporation of different types of CORBA protocol by accommodating for the unique characteristics of each type at a single notification center domain. Vendor-specific CORBA interface plugs account for style-differences between the vendors. Additional vendors-specific plugs are readily addable to the notification listener center, enabling flexibility in accommodating new vendors and new styles of CORBA.

Using the exemplary systems and methods described herein, an NMS system may be automatically notified of signals downstream that communicate changes in, for example, network creation/deletion notifications, configuration changes of ADSL network equipment, fault and alarms of network equipment, and other signals that an NMS system should be aware of. In response to such signals, NMS may make note of such changes and change the architecture of the entire network within its memory, reply with its own commands, or notify a programmer that such changes have been made, thereby letting the programmer become aware of changes that may need immediate attention, such as, for example, network failure.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

The invention claimed is:

1. A system for relaying information relating to changes in electronic architecture configurations, the system comprising:
   an electronic hardware component;
   a plurality of Electronic Management Systems (EMS) in communication with the electronic hardware component, wherein each of the plurality of EMS receives a notification signal transmitted by the electronic hardware component to each of the plurality of EMS when a physical change has been made in the electronic hardware component, wherein at least one EMS has a form of transmission language distinct from another EMS;
   a notification listener device in communication with each of the plurality of EMS, wherein the notification listener device is external to each of the plurality of EMS and receives the notification signal from each of the plurality of EMS and translates the notification signal into a CORBA format, wherein the notification listener device further comprises a software interface wall comprising one or more software plugs of which a plug corresponds to the electronic hardware component and receives notification signals from the electronic hardware component, wherein the notification listener device has an internal adapter corresponding to each of the different forms of transmission language of the plurality of EMS;
   a Network Management System (NMS) in communication with the notification listener device, wherein the NMS receives the translated notification signal that indicates information about the physical change in the electronic hardware component; and
   a CORBA access server, wherein the CORBA access server functions as a gateway to the NMS whereby the CORBA access server controls and filters the translated notification signal from the notification listener device.

2. The system of claim 1, wherein the notification signal is intrinsically generated by the electronic hardware component.

3. The system of claim 1, wherein the notification signal is generated by polling the electronic hardware component.

4. The system of claim 1, further comprising:
an asynchronous response medium for informing NMS of any changes in the electronic hardware component in real time when such a change occurs.

5. The system of claim 1, further comprising:
a queue device that stores and queues translated signals in an order from the notification listener device when the NMS is not operational, and then relays such queued signals to the NMS when the NMS again becomes operational.

6. A system for transmitting real time information upstream relating to a change in an electronic architecture, the system comprising:
a plurality of Electronic Management Systems (EMS) located upstream from and in communication with the electronic architecture, wherein each of the plurality of EMS receives a notification signal transmitted by the electronic architecture to each of the plurality of EMS when a physical change has been made to one or more hardware components comprising the electronic architecture, wherein at least one EMS has a form of transmission language distinct from another EMS;
a signal translating device which is external to each of the plurality of EMS and which is in communication with each of the plurality of EMS, wherein the signal translating device receives the notification signal from the EMS and translates it into a CORBA format and wherein the signal translating device has an internal adapter corresponding to each of the different forms of transmission language of the plurality of EMS; and
a Network Management System (NMS) in communication with the signal translating device, wherein the NMS receives the translated signal that indicates information about the physical change in the electronic architecture.

7. The system of claim 6, wherein the notification signal is intrinsically generated by the electronic hardware component.

8. The system of claim 6, wherein the notification signal is generated by polling, the electronic hardware component.

9. The system of claim 6, further comprising:
an asynchronous response medium for informing NMS of any changes in the electronic architecture in real time when such a change occurs.

10. The system of claim 6, further comprising:
a queue device that stores and queues translated signals in an order from the translating device when the NMS is not operational, and then relays such queued signals to the NMS when the NMS again becomes operational.

11. A system for relaying information relating to changes in electronic architecture configurations, the system comprising:
an electronic hardware component wherein the hardware component incorporates a firmware module;
a plurality of Electronic Management Systems (EMS) in communication with the electronic hardware component, wherein each of the plurality of EMS receives a notification signal transmitted by the electronic hardware component to each of the plurality of EMS when a physical change has been made in the electronic hardware component, wherein at least one EMS has a form of transmission language distinct from another EMS;
external means for receiving the notification signal from the EMS and translating it into a CORBA format, wherein the external means has an internal adapter corresponding to each of the different forms of transmission language of the plurality of EMS; and
an NMS in communication with the external means for receiving, the NMS receiving the translated signal that indicates information about the change in the electronic hardware component.

12. The system of claim 11, wherein the notification signal is generated intrinsically by the electronic hardware component.

13. The system of claim 11, wherein the notification signal is generated by polling the electronic hardware component.

14. The system of claim 11, further comprising:
an asynchronous response medium for informing NMS of any changes in the electronic hardware component in real time when such a change occurs.

15. The system of claim 11, further comprising:
means for queuing that stores and queues translated signals in an order from the receiving means when the NMS is not operational, and then relays such queued signals to the NMS when the NMS again becomes operational.

16. A device for receiving information relating to changes in downstream electronic architecture, the device comprising:
means for receiving information from each of a plurality of Electronic Management Systems (EMS) relating to physical changes in downstream electronic architecture, wherein the electronic architecture comprises all hardware components and any related firmware modules, wherein at least one EMS has a form of transmission language distinct from another EMS;
means for recognizing the information in its specific format;
means for translating the information into a CORBA format wherein the means has an internal adapter corresponding to each of the different forms of transmission language of the plurality of EMS;
means for transmitting the translated information to an upstream Network Management System NMS and;
means for storing information that is unable to reach the NMS, in the order received, until the NMS is reachable.

* * * * *